United States Patent
Chen et al.

(10) Patent No.: US 9,704,046 B2
(45) Date of Patent: *Jul. 11, 2017

(54) DISCOVERING OBJECT PATHWAYS IN A CAMERA NETWORK

(71) Applicant: International Business Machines Corporation, Armonk, NY (US)

(72) Inventors: Xiao Long Chen, Beijing (CN); Na Lv, Beijing (CN); Zhe Yan, Beijing (CN); Yun Zhai, Pound Ridge, NY (US); Zhuo Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,775

(22) Filed: Nov. 23, 2016

(65) Prior Publication Data
US 2017/0091563 A1 Mar. 30, 2017

Related U.S. Application Data

(63) Continuation of application No. 15/191,171, filed on Jun. 23, 2016, now Pat. No. 9,532,012, which is a (Continued)

(51) Int. Cl.
*G06K 9/00* (2006.01)
*G06T 7/40* (2017.01)
(Continued)

(52) U.S. Cl.
CPC ....... *G06K 9/00771* (2013.01); *G06K 9/6201* (2013.01); *G06K 9/66* (2013.01);
(Continued)

(58) Field of Classification Search
CPC ........ G08B 13/19689; G08B 13/19691; G08B 13/19693; G08B 13/19695;
(Continued)

(56) References Cited

U.S. PATENT DOCUMENTS

7,227,893 B1 * 6/2007 Srinivasa ........... G06K 9/00771
348/155
8,116,527 B2 2/2012 Sabol et al.
(Continued)

OTHER PUBLICATIONS

Chang et al., "Tracking Multiple People with a Multi-Camera System", 2001 IEEE Workshop on Multi-Object Tracking, 2001, pp. 19-26.
(Continued)

*Primary Examiner* — Tung Vo
(74) *Attorney, Agent, or Firm* — A. Imtiaz Billah

(57) ABSTRACT

In an approach to tracking at least one target subject in a camera network, a search is started to find a target subject on a camera within a camera network. Features are extracted from the target subject and search queries are initiated in other nearby cameras within the camera network. Search queries attempt to detect target subjects and present the finds in a ranked order. Application of aggregate searches in multiple cameras and prior search results are used to improve matching results in the camera network; propagate a search of the target subject to discover the full pathway in the camera network; and project future occurrences of the target subject in subsequent cameras in the camera network.

1 Claim, 4 Drawing Sheets

Related U.S. Application Data continuation of application No. 15/052,949, filed on Feb. 25, 2015, now Pat. No. 9,454,884, which is a continuation of application No. 14/867,269, filed on Sep. 28, 2015, now Pat. No. 9,495,763.

(51) Int. Cl.
| | | |
|---|---|---|
| *G06T 7/20* | (2017.01) | |
| *H04N 7/18* | (2006.01) | |
| *G06K 9/62* | (2006.01) | |
| *G06K 9/66* | (2006.01) | |

(52) U.S. Cl.
CPC ............ *G06T 7/2093* (2013.01); *G06T 7/408* (2013.01); *H04N 7/181* (2013.01); *G06T 2207/10016* (2013.01); *G06T 2207/20076* (2013.01); *G06T 2207/30232* (2013.01)

(58) Field of Classification Search
CPC ....... G08B 13/19697; H04N 21/24318; H04N 21/44008
USPC .......................................................... 348/143
See application file for complete search history.

(56) References Cited

U.S. PATENT DOCUMENTS

| | | | |
|---|---|---|---|
| 8,502,868 B2 | 8/2013 | Buehler et al. | |
| 8,744,125 B2* | 6/2014 | Zhu | G06K 9/68 382/103 |
| 9,134,399 B2 | 9/2015 | Brown et al. | |
| 9,454,884 B1 | 9/2016 | Chen et al. | |
| 9,495,763 B1 | 11/2016 | Chen et al. | |
| 2004/0249848 A1* | 12/2004 | Carlbom | G06F 17/30017 |
| 2007/0071285 A1* | 3/2007 | Kontsevich | G06K 9/6211 382/103 |
| 2008/0063236 A1 | 3/2008 | Ikenoue et al. | |
| 2010/0040296 A1* | 2/2010 | Ma | G06K 9/6249 382/225 |
| 2011/0081043 A1* | 4/2011 | Sabol | G06T 7/2053 382/103 |
| 2013/0198197 A1* | 8/2013 | Sawhney | G06F 17/3087 707/741 |
| 2014/0093127 A1 | 4/2014 | Mundhenk et al. | |
| 2014/0211988 A1* | 7/2014 | Fan | G06K 9/3241 382/103 |
| 2014/0333775 A1* | 11/2014 | Naikal | H04N 7/181 348/159 |
| 2015/0016798 A1* | 1/2015 | Fujimatsu | G06K 9/00362 386/223 |
| 2016/0092736 A1* | 3/2016 | Mai | G06K 9/00624 382/103 |

OTHER PUBLICATIONS

Fleuret et al., "Multi-Camera People Tracking with a Probabilistic Occupancy Map", Mar. 27, 2007, pp. 1-35.

Hsu et al., "Cross-Camera Vehicle Tracking via Affine Invariant Object Matching for Video Forensics Applications", 2013 IEEE International Conference on Multimedia and Expo (ICME), Jul. 15-19, 2013, pp. 1-6.

Javed et al., "Modeling inter-camera space-time and appearance relationships for tracking across non-overlapping views", Computer Vision and Image Understanding 109, 2008, pp. 146-162, Elsevier.

Ouyang et al., "Cross-View Object Tracking by Projective Invariants and Feature Matching", Advances in Multimedia Information Processing—PCM 2008, LNCS 5353, 2008, pp. 811-814, Springer-Verlag Berlin Heidelberg.

Zervos, Michalis, "Multi-camera face detection and recognition applied to people tracking", Master Thesis, CVLab: Computer Vision Laboratory, School of Computer and Communication Sciences, Ecole Polytechnique Fédérale de Lausanne, Jan. 2013, pp. 1-67.

Zhang et al., "Video Surveillance using a Multi-Camera Tracking and Fusion System", Workshop on Multi-camera and Multi-modal Sensor Fusion Algorithms and Applications—M2SFA2 2008, Oct. 2008, pp. 1-13, Marseille, France.

Zhao et al., "Real-time Wide Area Multi-Camera Stereo Tracking", Proceedings of the 2005 IEEE Computer Society Conference on Computer Vision and Pattern Recognition (CVPR'05), Jun. 20-25, 2005, pp. 976-983, vol. 1.

Chen et al., "Discovering Object Pathways in a Camera Network"; U.S. Appl. No. 15/191,171, filed Jun. 23, 2016, 25 pages.

List of IBM Patents or Patent Applications Treated as Related, Filed Dec. 19, 2016, 2 pages.

List of IBM Patents or Patent Applications Treated as Related, Filed Dec. 7, 2016, 2 pages.

\* cited by examiner

DISCOVERING OBJECT PATHWAYS IN A CAMERA NETWORK

BACKGROUND OF THE INVENTION

The present invention relates generally to information processing techniques and more specifically to discovering object pathways of a target subject in a camera network.

Digital videos obtained from surveillance cameras are sources of data to perform investigations such as finding vehicles; searching for and finding people with specific attributes; detecting abandoned packages; and detecting traffic violations. These tasks are typically achieved by manual browsing or by employing commercial video analytic solutions. Investigators and video analysis personnel carry out these tasks by individually reviewing any relevant camera devices in a surveillance camera network.

SUMMARY

According to one embodiment of the present invention, a method for tracking at least one target subject in a camera network, the method comprising the steps of: receiving, by one or more processors, a selection of at least one target subject in a first image taken by a first camera from a user; populating, by one or more processors, one or more databases with one or more features of the at least one selected target subject; initiating, by one or more processors, one or more search queries to a set of cameras within a camera network near the first camera, wherein the one or more search queries are used to determine, in an iterative manner, whether at least one of the one or more features of the at least one selected target subject is present in at least one image from at least one camera of the set of cameras; responsive to determining at least one of the one or more features is present in at least one image from at least one of the set of cameras, analyzing, by one or more processors, a set of results received from the one or more search queries to determine whether the at least one selected target subject in the first image is present in one or more images from the set of cameras; and responsive to determining the at least one selected target subject is present in one or more images from the set of cameras, propagating, by one or more processors, a search of the at least one selected target subject within the set of cameras within the camera network.

Another embodiment of the present invention provides a computer program product for tracking at least one target subject in a camera network based on the method described above.

Another embodiment of the present invention provides a computer system for tracking at least one target subject in a camera network, based on the method described above.

DETAILED DESCRIPTION

Law enforcement, investigative, academic, or other personnel may examine video or images retrieved from multiple cameras during the course of investigations. Efforts to focus on achieving exact object-to-object matches across camera views are time-consuming and may not be accurate enough to establish reliable object associations. For example, false negatives (e.g., missing detections/incorrect matches) are particularly not favored during criminal investigations. Embodiments of the methods and systems for the present invention assist the investigation process by narrowing the search range of cameras examined and semi-automatically or automatically speeding up the forensic analysis. Embodiments of the present invention focus on discovering the pathways of target subjects in a surveillance camera network, where an operator of a camera network initiates the search by locking in on a target subject in one camera and propagating the target subject's pathway to neighboring cameras.

Figure 1:
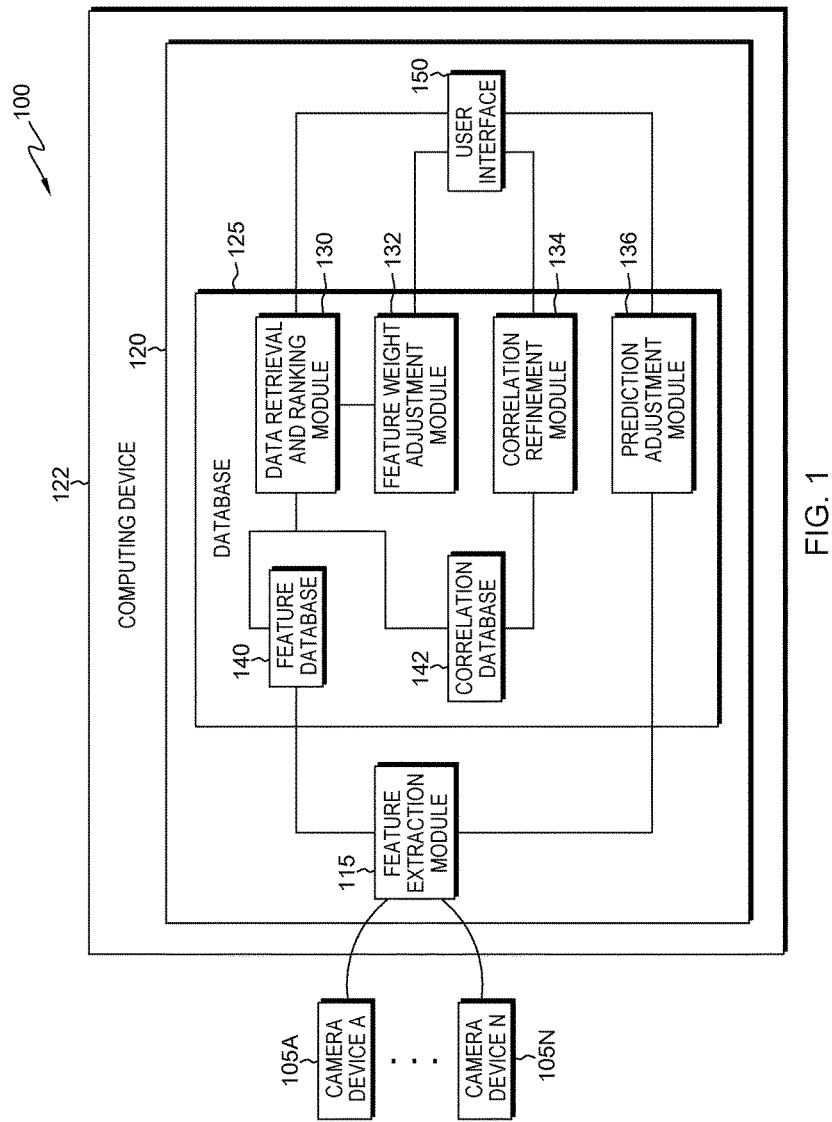
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes computing device 122 and camera devices 105A to 105N.

Camera devices 105A-105N are connected to analytics module 120 on computing device 122. Camera devices 105A-105N record images, using known methods and functionalities, as individual still images or videos. The individual still images or videos can be stored locally on a camera device 105A-105N, on computing device 122, transmitted to another location (i.e., another computing device), via a network, or both. The number of camera devices working in conjunction with analytics module 120 vary in different embodiments.

In another embodiment, camera devices 105A-105N connect to computing device 122 via a network. The network can be, for example, a local area network (LAN), a wide area network (WAN) such as the Internet, or a combination of the two, and can include wired, wireless, or fiber optic connections. In general, the network can be any combination of connections and protocols that will support communication between computing device 122 and camera devices 105A-105N. In an embodiment, a network can include a cloud computing network.

Computing device 122 serves as a host to analytics module 120. A computing device 122 may be a laptop computer, a tablet computer, a netbook computer, a personal computer (PC), a desktop computer, a personal digital assistant (PDA), a smart phone, a thin client, or any programmable electronic device capable of executing machine readable program instructions and communicating with various components and devices within data processing environment 100. The computing device may include internal and external hardware components, as depicted and described in further detail with respect to FIG. 5.

Analytics module 120 includes feature extraction module 115, database 125, and user interface 150. In this exemplary embodiment, each of these components reside on the same computing device. In other exemplary embodiments, the components are deployed on one or more different computing devices within data processing environment 100 such that camera devices 105A-105N can work in conjunction with feature extraction module 115, database 120, and user interface 150.

Feature extraction module 115 is connected to camera devices 105A to 105N; feature database 140; and prediction adjustment module 136. Feature extraction module 115 extracts features from a target subject found on a camera device or camera devices. Feature extraction module 115 can detect, track moving objects, and extract features of moving objects.

Database 125 includes data retrieving and ranking module 130; feature weight adjustment module 132; correlation refinement module 134; prediction adjustment module 136; feature database 140; and correlation database 142. Database 125 serves as a repository of features and correlations of target subjects found on images or video retrieved from camera devices 105A-105N. A database is an organized collection of data. Database 125 can be implemented with any type of storage device capable of storing data and configuration files that can be accessed and utilized by computing device 122, such as a database server, a hard disk drive, or a flash memory.

Data retrieval and ranking module 130 uses the data from feature database 140. Data retrieval and ranking module 130 retrieves features in the form of data to be processed from correlation database 142, populates search queries to locate relevant features in neighboring cameras, and generates a ranking using weighted correlations with respect to located features. Data retrieval and ranking module 130 is connected to user interface 150; feature weight adjustment module 132; and feature database 140. The features are sent to feature database 140 to be later processed by data retrieval and ranking module 130.

Feature weight adjustment module 132 is connected to user interface 150 and data retrieval and ranking module 130. Operational steps of feature weight adjustment module 132 are used in the estimation of object matching across cameras. Object matching across two cameras takes into consideration a correlation weight and a feature weight in a query. Correlation weights are weights of the feature-based correlation models between two cameras. One or more feature sets may include color similarity, overlapping of facial attributes, spatiotemporal proximity, etc. Feature sets are incorporated into feature-based correlation models in order to determine what the distinctive features of a target subject are and analyze images across multiple cameras. For example, in an indoor camera network where the lighting is ambient and stable, the color information in different cameras can be considered relatively similar (e.g., a person wearing red would appear "red" in both cameras A and B). Since there might be several different hallways or staircases between cameras A and B, the spatiotemporal proximity might not be as distinctive as the color similarity model. In another situation such as an outdoor highway setting where the lighting is dynamic but the traveling path is constrained, the spatiotemporal proximity plays a more important role than the color similarity. A feature weight in a query is the weight used to determine the distinctive features of a target subject. For instances of a target subject observed with the facial attributes of having a "beard" across multiple cameras, the facial attributes would have higher weight in the search query. In another instance, a target subject may wear or take off a red jacket from one camera to another. Thus, the color is not a distinctive feature of the target subject and color matching would have a lower weight in the search query.

Correlation refinement module 134 obtains correlation data and sends the obtained correlation data to correlation database 142. Based on an operator's configuration of correlation models, analytics module 120 applies the correlation model to the target subject. Correlation data is obtained from the target subject upon application of the correlation model. Correlation data are derived from features (e.g., spatial trajectory, color characteristics, detected sizes, or other features supported by the camera network) of a target subject observed in at least two cameras. Correlation refinement module 134 is connected to user interface 150 and correlation database 142.

Prediction adjustment module 136 is connected to user interface 150 and feature extraction module 115. Analytics module 120 performs queries to find a target subject in cameras within the camera network. Visual images deemed to be a "match" by the operator from the queries are compiled in aggregate by analytics module 120. The data obtained from prediction adjustment module 136 is sent to feature extraction module 115. Whether a "next camera" is in a "search" mode or a "detection" mode depends on the spatiotemporal projection of the target subject's occurrence. In more undefined situations pertaining to spatiotemporal projections of the target subject's occurrence, both search and detection refinements are carried out to enhance search/detection effectiveness and efficiency.

Feature database 140 is connected to and communicates with data retrieval and ranking module 130 and feature extraction module 115. Feature extraction module 115 obtains feature data from camera devices 105A to 105N and sends the obtained feature data to feature database 140. Operators focus on a certain feature and/or certain features of a target subject and select them as being pertinent for finding the target subject in other cameras devices. Data retrieval and ranking module 130 works in conjunction with feature module 115 in order consider data from feature and furthermore compute a ranking of visual images deemed to be a match.

Correlation database 142 is connected to and communicates with data retrieval and ranking module 130 and correlation refinement module 134. Correlation refinement module 134 obtains correlation data and sends the obtained correlation data to correlation database 142. The likelihood of a target subject in a second camera to be the same target subject who appeared in the first target depends on a feature set of a target subject in respective camera views and correlation between the observed features in the first and second camera. A correlation model is configured by an operator via user interface 150. In one embodiment, the correlation model is based on color is a histogram intersection. In another embodiment, the correlation model is based on proximity using spatiotemporal prediction. Correlation data pertains to the correlation between features obtained from a visual image deemed to be a target subject observed within two cameras. Correlation refinement module 134 is connected to user interface 150 and correlation database 142.

User interface 150 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 150 is capable of receiving data, user commands, and data input modifications from a user and is capable of communicating with modules and components within data processing environment 100, such as analytics module 120, data retrieval and ranking module 130; feature weight adjustment module 132; correlation refinement module 134; and prediction adjustment module 136. In various embodiments of the present invention, a user interacts with user interface 150 in order to provide feedback to analytics module 120.

While FIG. 1 depicts analytics module 120 including a plurality of modules for operation of the invention, one of skill in the art will understand that each of the functions and capabilities of each of the modules may be performed by analytics module 120 on computer 122.

Figure 2:
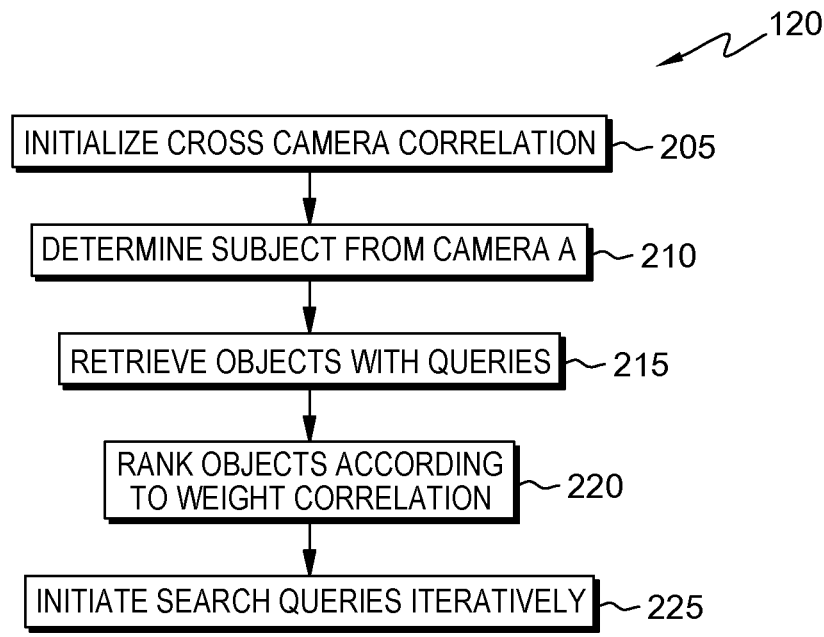
FIG. 2 is a flowchart depicting the operational steps of an analytics module for recovering a pathway of a subject in a camera network, in accordance with an embodiment of the present invention.

FIG. 2 is a flowchart depicting the operational steps of analytics module 120 for recovering a pathway of a subject in a camera network, in accordance with an embodiment of the present invention.

In step 205, analytics module 120 initializes cross camera correlation. At an initial point, cross camera correlations are initialized using only existing domain knowledge via correlation refinement module 134. The existing domain camera coordinates in real-world terms are known (e.g., GPS coordinates and/or floor-plan coordinates). Auxiliary information such as camera orientation can also be part of the initial input to the camera network. Camera correlations are primarily estimated based on their real-world proximities. For example, if the distance from camera A to camera B is 100 meters, analytics module 120 can assume it would take approximately 1 minute for a person to walk from camera A to camera B. In this embodiment, spatial proximity correlation would have a higher weight over other features (e.g., color similarity) while performing cross camera correlation.

In step 210, analytics module 120 determines a target subject from Camera A. The camera network described in FIG. 2 includes at least two cameras—Camera A and Camera B. When a target subject (e.g., a person) is locked in camera A by analytics module 120, features such as trajectory data, moving speed, cloth color, etc. of the target subject are extracted using known analytics methods from the still image or video and sent to database 125 (and more specifically to feature database 140). Analytics module 120 determines a target subject based, at least in part, on input from a user via user interface 150. In another embodiment, a user selects features from the still image or video recorded by camera A and input the features to be used by analytics module 120.

In step 215, analytics module 120 retrieves objects with queries. Correlation weights are the weights of feature-based correlation models between two cameras. Feature weights are the weights to determine the distinctive features of a target object. The correlation weights and the features weights are configured by an operator. In various embodiments, the objects retrieved may be target subjects or features of the target subjects. Search queries can be automatically populated using extracted features to retrieve relevant objects in neighboring cameras. In another embodiment, a search query may be automatically populated with a target subject. Weight is given to a feature based on how distinctive a feature is as opposed to how readily a feature can be changed. For example, if an image is derived from neighboring cameras, the found target subject may not always have on his jacket, suggesting that this feature is not "distinctive" enough to be a valid indicator for searching and thus given less weight. In conjunction with correlation refinement module 134 and feature weight adjustment module 132, variables such as a feature set, correlation models, feature correlation, and feature weight are configured by an operator. The correlation weights used to search in different cameras can be different. For example, in some camera pairs, spatial proximity works better, while for other camera pairs, color similarity works better. In certain instances, a particular type of correlation model would be more appropriate. Target subjects within a highway settings have dynamic lighting within a constrained traveling path and thus using spatiotemporal proximity within a correlation model is more distinctive than a color-based correlation model. In some embodiments, all of the features extracted from a target subject will be put into a query. In other embodiments, only certain distinctive features extracted populate a search query. Different features can have different weights within the same query. Certain cameras capture specific features and visual images differently than others (i.e., red in one camera is bright while red in a second camera is dark). The operator can program the correlation model to account for differences in appearances of visual images in different cameras by configuring different features as having different weights within the same query.

Analytics module 120 invokes correlation refinement module 134 to determine the likelihood—L—of a target subject Y' found in camera B to be the same target subject Y which previously appeared in camera A, can be described using the equation, Eq. 1, below:

$$L(Y \rightarrow Y': F_{Camera\ A}(Y) \otimes F_{Camera\ B}(Y'))  \quad\text{(Eq. 1)}$$

where F is the observation (feature set) of a target Y or target Y' in its respective camera views and $\otimes$ is a general notation for correlation between the observed features in two cameras. For example, features of an observed person within a camera network include spatial trajectory, color characteristics, moving speed, entry/exit points of the person, facial attributes (e.g., bold), detected sizes, and other features that a camera network supports. Elements (e.g., features) can be added to and removed from F by reconfiguring the existing algorithm. A correlation model based on color may be a histogram intersection. A correlation model may be a proximity using spatiotemporal prediction. Eq. 1 allows for a way of quantifying L. The single values for L which are generated can be recited as absolute values or a set of normalized values.

Analytics module 120 invokes feature weight module 132 to determine a feature weight when matching a set of two observations across two cameras. Both the correlation weight and the feature weight are taken into consideration in combination with the correlation models allowing for the searched results to be ranked accordingly. Correlation weights are the weights of the feature-based correlation models between two cameras and configured by an operator. A ranking is computed by taking a linear combination of all correlation models weighted by the product of the correlation weight and the feature weights. The equation, Eq. 2 below, utilized by analytics module 120 is:

$$E = \text{Sum}_{i \rightarrow n}(w_c^i w_f^i F_i)  \quad\text{(Eq. 2)}$$

where E is the rank measure; n is the number of correlation models; $w_c^i$ is the correlation weight of the correlation using a feature i; $w_f^i$ is the feature weight of the feature i for the current searched target subject; and $F_i$ is the feature correlation model between the two cameras using a feature i (e.g., color similarity, overlap of facial attributes, spatiotemporal proximity, and etc.).

In step 220, analytics module 120 ranks objects according to weight correlation. Objects are a superset which contain the target subject. For example, if the target subject is a person, the "objects" returned from searches may be a group of people which satisfy the search criteria to some extent and are ranked based on their relevance. In addition, there may be "noise" (e.g., non-human "search results" detected as people) in the target subjects. The objects from neighboring cameras are retrieved and ranked according to the weighted correlations for all relevant features using Eq. 2 via analytics module 120. Eq. 2 computes the E value which gives objects a ranking value. In an embodiment, an operator performs an assessment on the ranked results and determines the correct match of the target subject. The selected match is considered a positive match and is fed back to the system to enhance the correlation model of the respective camera pair.

In step 225, analytics module 120 initiates search queries iteratively. After discovering each occurrence of the same target subject in subsequent cameras, the analytics module 120 takes information from each such occurrence and refines its search queries in the next steps. Such a search process is continued until the full pathway of the target subject is recovered in the camera network. Analytics module 120 can also take the historical search information to make predictions of target subject occurrences in cameras within the camera network. Utilizing the steps discussed above, analytics module 120 can recover the full pathway of a target in the camera network.

Figure 3:
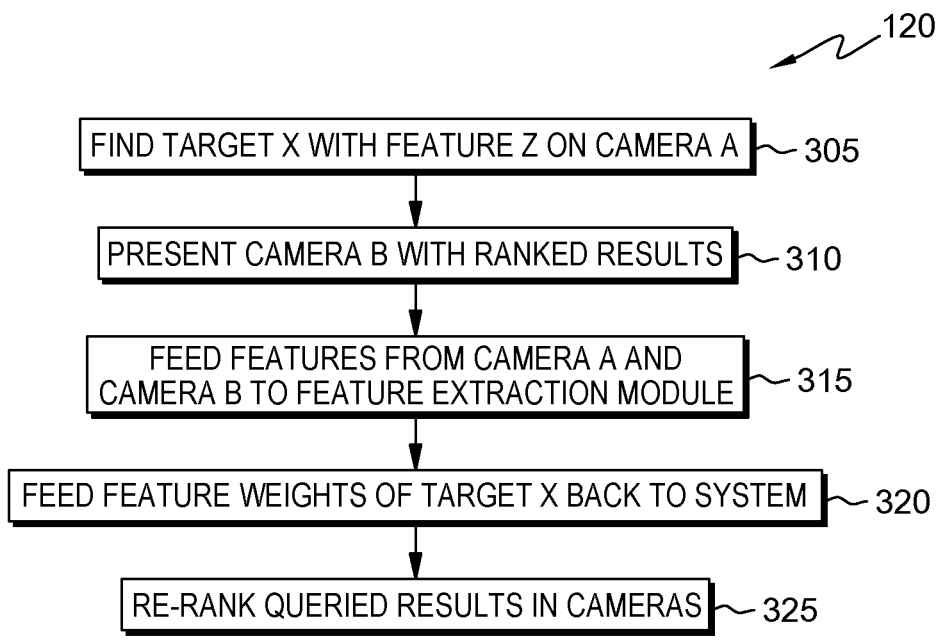
FIG. 3 is a flowchart depicting the operational steps of the analytics module for accumulating re-ranking of search results using aggregated search results, in accordance with an embodiment of the present invention.

FIG. 3 is a flowchart depicting the operational steps of analytics module 120 for accumulating re-ranking using aggregated search results, in accordance with an embodiment of the present invention.

In this exemplary embodiment, analytics module 120 is not achieved by isolated camera-pairs and the camera network includes cameras A, B, C, and D. For example, a target subject—target X—travels from camera A to cameras B, C, and D in a temporal sequential order. Other solutions generally establish the association first from camera A to camera B, then from camera B to camera C, and finally from camera C to camera D. Analytics module 120 uses previously discovered information from camera A, camera B, and camera C to infer the occurrence of target X in camera D. This generates aggregated search results of the current target X and re-ranks the searched events in subsequent cameras. Simple spatiotemporal proximity and color similarity are the correlations in cameras A, B, C, and D. In other embodiments, different feature sets and correlation models can be adopted and integrated into analytics module 120.

Using the aggregated search results, analytics module 120, using prediction adjustment module 136, automatically adjusts video analytics in one or more camera views where the target subject is expected to appear. This applies to situations where the occurrence of the target subject in a next camera has not yet happened at the time when the search is taking place. For example, a target subject travels through cameras A, B, C and D. All four cameras (A, B, C, and D) are able to detect facial attributes. Each camera has an analytic component which detects facial attributes configured with a set of default parameters. The target subject has already appeared in cameras A, B, and C, but not yet in camera D. The operator has successfully found and confirmed to analytics module 120 via feedback occurrences of the target subject in cameras A, B, and C and the corresponding features are also retrieved by analytics module 120. During an accumulative re-ranking using aggregated search results, analytics module 120 has assessed that this target subject has a facial attribute of a "beard" in cameras A, B, and C. After adjusting the feature weight, prediction adjustment module 136 determines that the facial attribute of a "beard" is a very distinctive feature. Therefore, the analytic component in camera D (the camera where the target has not appeared in but may in the future) automatically adjusts its sensitivity parameters to "focus" more on detecting a "beard". The default analytic parameters on camera D before the adjustment may not be sensitive enough and the true appearance of the target may possibly be missed or put in a low rank. After the analytic adaptation, it is more likely that the target subject's facial attributes can be discovered, and thus decrease the likelihood of misdetection (i.e., false negatives). The ranking model utilized for identifying paths of the multiple target subjects can be adjusted.

In step 305, analytics module 120 finds a target X with a feature Z on camera A. In this exemplary embodiment, the occurrence of target X with feature Z in cameras B, C, and D are primarily based on the time, and based on physical proximity, it takes for movement from camera A to camera B; camera A to camera C; and camera A to camera D. In this exemplary embodiment, the feature weight of spatiotemporal correlation is the dominant term for generating a ranking.

In step 310, analytics module 120 presents the ranked results (to an operator). In this exemplary embodiment, an operator is presented with the ranked search results and the operator discovers the same target X with the same feature Z in the results. The operator manually specifies the match as a "true occurrence" of target X with feature Z assuming the feature Z is also found on Camera B.

In step 315, analytics module 120 feeds features from camera A and camera B to feature extraction module 115. In this exemplary embodiment, analytics module 120 receives the operator's response and analytics module 120 feeds observations (i.e. features) of target X in cameras A and B to feature extraction module 115. At this point, since feature Z has been observed in both occurrences, a feature weight for a particular feature is increased. For example, if feature Z is a red hat, the feature weight for color is increased, and analytics module 120 has an increased confidence level in using color for matching.

In step 320, analytics module 120 feeds the feature weights of target X back to the system. In this exemplary embodiment, analytics module 120 re-learns the feature weights of target X and this is used as an additional input by analytics module 120.

In step 325, analytics module 120 re-ranks queried results in cameras. In this exemplary embodiment, the queried results are re-ranked in subsequent cameras in a temporal sequence. The updated feature weights which are employed by analytics module 120 improve the relevance of the results generated. In addition to the updated feature weights, the aggregated search results can also update the correlation computation. For example, the projected occurrence time of the target in camera D can be refined using observations in multiple cameras compared to using the starting camera A.

Figure 4:
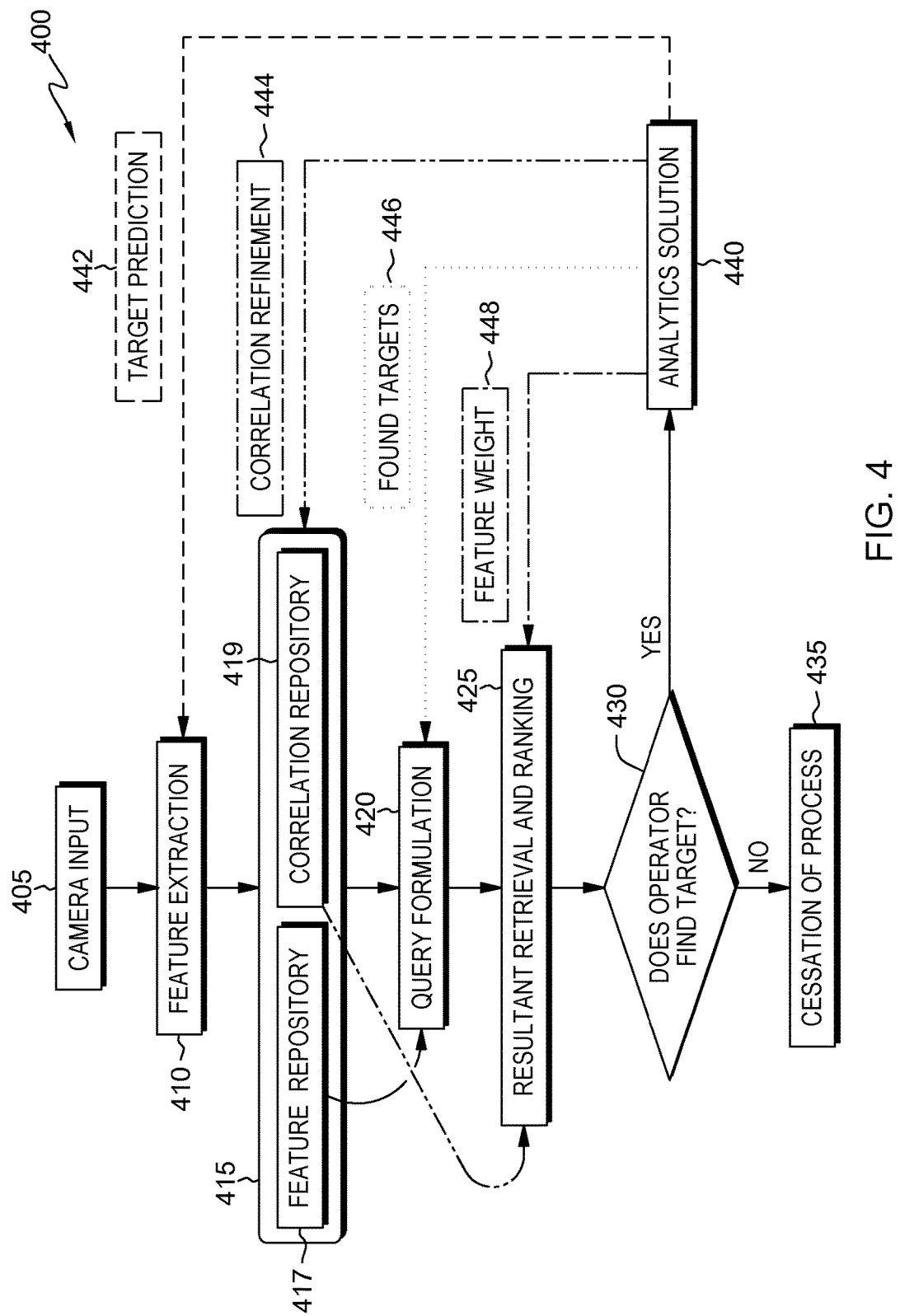
FIG. 4 is a depiction of the flow of data during operation of the analytics module while searching for a pathway of a subject in the camera network, in accordance with an embodiment of the present invention.

FIG. 4 is a depiction of the flow of data during operation of analytics module 120 while searching for a pathway of a subject in the camera network, in accordance with an embodiment of the present invention.

Analytics module 120 obtains camera input 405. Camera input 405 can be data which takes the form of correlation models and a visual image. The visual image is found on a camera device or camera devices, such as camera devices 105A to 105N, and is the "target subject" of interest to an operator. Correlation models (which are described above) may take into account a single factor or multiple factors such as spatial temporal proximity and color schematics.

Analytics module 120 obtains feature extraction data 410 (i.e., features) of the target subject. These features of the target subject are treated as data amenable for further processing by analytics module 120. Feature extraction data 410 may include a single feature or multiple features of the target subject.

Repository 415 contains feature repository 417 and correlation repository 419. Feature extraction 410 data 410 is stored in feature repository 417. Correlation data obtained from camera input 405 data are sent to correlation repository 419.

Analytics module 120 configures the variables of Eq. 1 and Eq. 2, as query formulation 420 data in FIG. 4, in order to find the likelihood of matching targets and the ranking of images, respectively. Data from feature repository 417 can alone be incorporated into a query formulation to furnish query formulation 420 data.

Analytics module 120 generates the results from Eq. 1 and Eq. 2, represented as resultant retrieval and rank 425 data, to output to a user the likelihood of matching target subjects and the ranking of images. The resultant retrieval and rank 425 data can be determined directly from correlation repository 419 (and by-passing query formulation 420 data).

To obtain operator interaction 430 data, analytics module 120 determines if the operator finds the target subject. The operator analyzes resultant retrieval and rank 425 data.

If the operator determines that the target subject has not been found, then no further steps are taken on resultant retrieval and ranking 425 data. Analytics model 120 no longer processes the data and is now in cessation of process 435.

If the operator determines that the target subject has been found, then analytics module 120 applies analytics solution 440. Analytics solution 440 may be result 442, result 444, result 446, and result 448.

Analytics module 120, utilizing feature weight result 448 in analytics solution 440, initiates adjustment of the "feature weight data" while recalculating results in resultant retrieval and ranking 425. The variable $w_c^i$ and $w_f^i$ can be reconfigured and thus potentially altering the E value of Eq. 2. Feature weights determine what the distinctive features of the target subject are. If a distinctive feature is found by an operator, then the distinctive feature found by the operator may be reconfigured to have a higher $w_f^i$ value.

Analytics module 120, utilizing found targets result 446 in analytics solution 440, initiates the sending of "found targets data" for query formulation 420. The process is repeated by taking into account the new found target subject data. Eq. 1, which finds the likelihood of a target in a second camera as being the same target in the first camera analyzed, is recalculated. The feature sets and correlation between the observed target features amongst the two cameras can be reconfigured. Thus, the L value of eq. 1 can be altered upon reconfiguring the feature sets and correlation variables.

Analytics module 120, utilizing correlation refinement result 444 in analytics solution 440, initiates "correlation refinement data" to correlation database 419. Correlation refinement data flows through an interactive system by automatically populating query formulations and ranking queried results based on correlation models and feature weights. Additionally, the operators may provide positive training samples by manually marking object matches across cameras. In an exemplary embodiment, only prior knowledge on a cameras' locations in real-world terms is processed. The camera-to-camera correlations is dominated by the spatiotemporal proximity. When the operator searches for occurrences of a target subject from one camera to another camera, the queried results are ranked based on the proximity of the target subject's occurrence time in one camera and its projected occurrence time in another camera. Other feature models such as color and face attributes do not play much of a role in this ranking because there is no prior knowledge in these correlation models. When the operator marks a match of the target subject between one camera and another camera, the target subject's observations are used as the positive training to refine the correlation models and correlation weights. For example, a target subject's color is perceived as "red" in one camera and as "dark orange" in another camera. The operator has manually determined that these two objects are the same person and is implying that there is a mapping from "red" to "dark orange" from one camera to another camera, respectively. Thus, the color correlation model is enhanced by this new positive sample. In addition, since a correlation is found in the color spectrum, the correlation weight for that color model is also increased. By repeating the search process with an operator's input, analytics module 120 can iteratively enhance the cross camera correlations in the network and learn the weights of these feature correlations.

Analytics module 120, utilizing target predication result 442 in analytics solution 440, initiates "target prediction" and sends the data from the target subject prediction to feature extraction 410. Result 442 allows for the automatic adjustment of the video analytics in camera views where a target subject is expected to appear. This applies to situations where the occurrence of the target subject in the next camera has not yet happened at the time during which the search is actively being conducted. For example, a target subject is captured by camera A, camera B, and camera C and not yet in camera D. The features from camera A, camera B, and camera C are retrieved after finding the target subject occurrence in camera A, camera B, and camera C. Eventual accumulative re-ranking using aggregated search results leads to focusing on a key feature or set of key features. The feature can be adjusted to get camera D to focus more on the key feature or set of key features in order to facilitate the finding of the target subject from camera A, camera B, and camera C in camera D.

Figure 5:
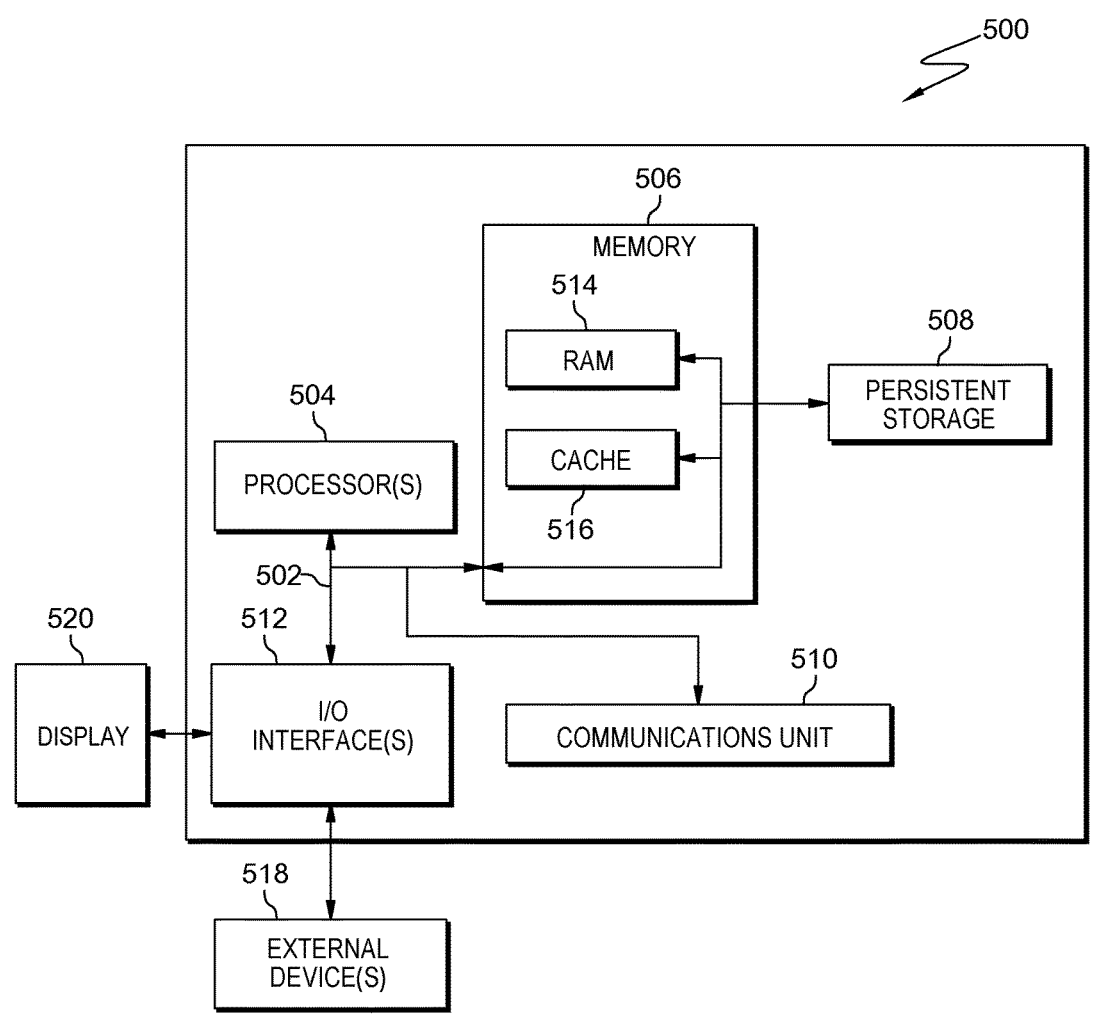
FIG. 5 depicts a block diagram of internal and external components of a computing device, such as the computing device of FIG. 1, in accordance with an embodiment of the present invention.

FIG. 5 depicts a block diagram of components of a computing device, such as computing device 122, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for tracking at least one target subject in a camera network, the computer program product comprising:
   a computer processor;
   a non-transitory computer readable storage medium; and
   program instructions stored on the non-transitory computer readable storage medium for execution by the computer processor, the program instructions comprising:
      program instructions to receive, at a user interface, a selection of at least one target subject in a first image taken by a first camera from a user;
      program instructions to extract, by a feature module, one or more features of the selected at least one target subject;
      program instructions to store, by a feature database, the extracted one or more features of the selected at least one target subject;
      program instructions to correlate, by a correlation module, the extracted one or more features of the selected at least one target subject, among a set of at least two cameras;
      program instructions to apply, by the correlation module, a first equation which quantifies a probabilistic likelihood another target subject found in a second camera is the same as the target subject found in the first camera, wherein the probabilistic likelihood is defined in terms of L as:

$L(\text{Target Subject in First Camera} \to \text{Target Subject in Second Camera}) = F_{First\ Camera}(\text{Target Subject in First Camera}) \textcircled{x} F_{second\ Camera}(\text{Target Subject in Second Camera}));$ where $\textcircled{x}$ is a correlation between the Target Subject in First Camera and Target Subject in Second Camera;
      program instructions to apply, by a feature weight module, a second equation which takes a linear combination of the correlated one or more extracted features to quantify a ranking while matching the other target subject found in the second camera and the target subject found in the first camera, and modifying a criticality associated with a plurality of features among the extracted one or more features over another plurality of features among the extracted one or more features, wherein the ranking is described in terms of E as:

$E = Sum_{i \to n}(w_c^i w_f^i F_i);$ where E is the rank measure, $Sum_i$ is the linear summation of a feature, n is the number of correlation models, $w_c^i$ is the correlation weight of the correlation using a feature i, $w_f^i$ is the feature weight of the feature i for the current searched target subject, and Fi is the feature correlation model between the two cameras using a feature i;
      program instructions to rank, by a ranking module, a plurality of potential matches for the first target based on the second equation, wherein a higher E value for a potential match among the plurality of potential matches is indicative of a higher rank based on parameters configured in the second equation;
      program instructions to automatically re-rank, by the ranking module, the plurality of potential matches by reconfiguring the parameters in the first equation and the second equation;
      program instructions to iteratively perform, by the ranking module, one or more search processes with a new input to enhance a camera-to-camera correlation based on the one or more extracted features;
      responsive to determining the selected at least one target subject is present in one or more images from a set of cameras, program instruction to apply, by a predicting adjustment module, a first analytics solution, wherein the first analytics solution predicts an occurrence of the selected at least one target in a next camera based on finding the at least one selected target in a previous camera;
      responsive to determining the selected at least one target subject is present in the one or more images from the set of cameras, program instructions to apply, by the correlation refinement module, a second analytics solution, wherein the second analytics solution populates a first plurality of queries based on one or more correlation models; and responsive to determining the selected at least one target subject is present in the one or more images from the set of cameras, program instructions to apply, by the feature weight module, a third analytics solution, wherein the third analytics solution populates a second plurality of queries based on weighted criticality of the one or more extracted features.

* * * * *